United States Patent [19]
Chien

[11] Patent Number: 5,524,435
[45] Date of Patent: Jun. 11, 1996

[54] EXHAUST GAS CLEANING APPARATUS

[76] Inventor: Chung M. Chien, No. 15, Hoping Rd., Au-Hua Village, Nan-Au Hsiang, Ilan Hsien, Taiwan

[21] Appl. No.: 257,135

[22] Filed: Jun. 9, 1994

[51] Int. Cl.⁶ .................................................... F01N 3/02
[52] U.S. Cl. .................................................. 60/309; 60/320
[58] Field of Search .......................... 60/309, 310, 311, 60/320

[56] References Cited

U.S. PATENT DOCUMENTS

| | | | |
|---|---|---|---|
| 3,630,030 | 12/1971 | Wagner | 60/310 |
| 3,793,807 | 2/1974 | Prem Das | 60/310 |
| 3,817,222 | 6/1974 | Staib | 60/310 |
| 5,121,602 | 6/1992 | McCorvey | 60/309 |

Primary Examiner—Leonard E. Heyman
Attorney, Agent, or Firm—Bacon & Thomas

[57] ABSTRACT

The exhaust gas of a motor vehicle is cleaned of contaminants by passing the gas through an inclinded partition box disposed within a shell container, wherein a plurality of collection cylinders are supported by the box for separating the exhaust gas contaminants which are collected in a waste bucket. The water vapor in the exhaust gas is condensed by air received in and discharged from the shell container through filters at both ends thereof.

3 Claims, 10 Drawing Sheets

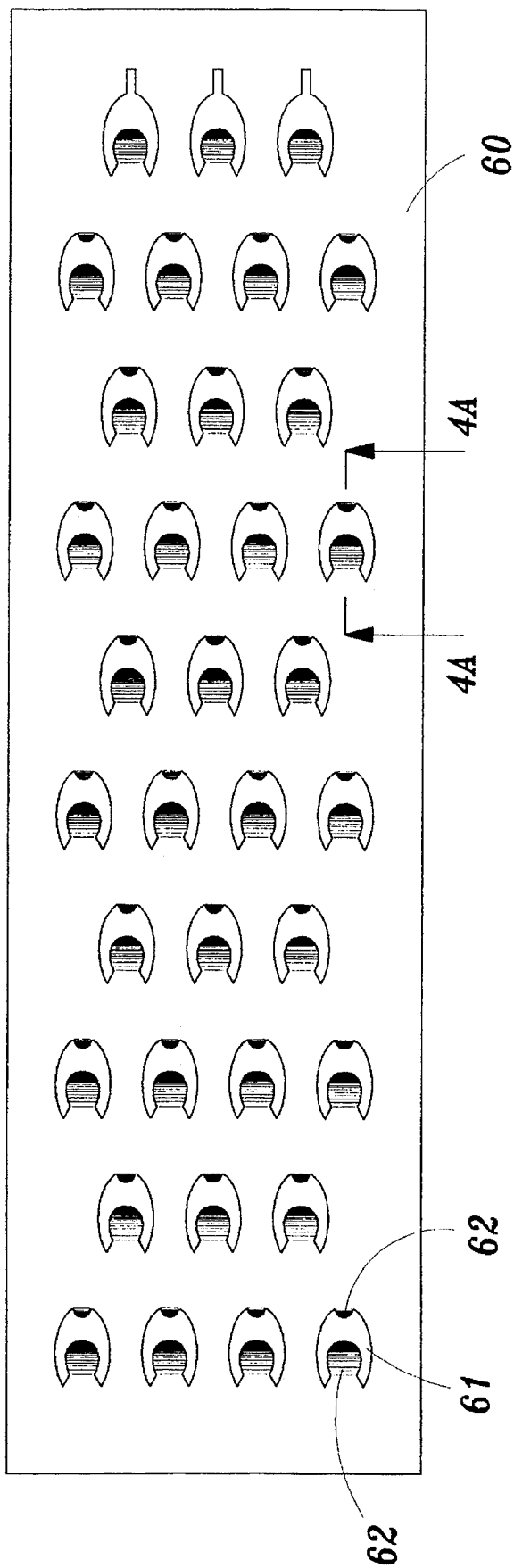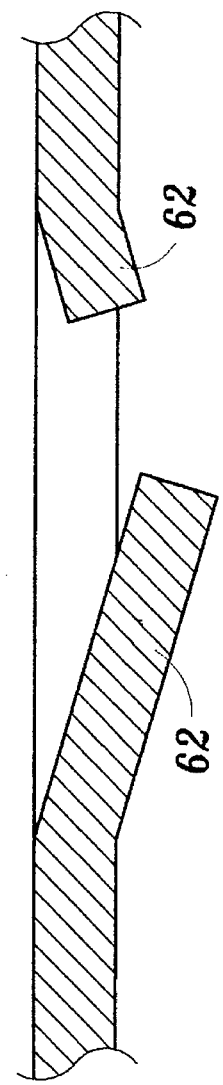
FIG. 4
FIG. 4A

EXHAUST GAS CLEANING APPARATUS

BACKGROUND OF THE INVENTION

1. Field of the Invention

The present invention relates to an intake and exhaust gas claning apparatus, and more particularly to an exhaust gas cleaner for automobiles, motorcycles and factories.

2. Description of the Prior Art

Air pollution is becoming a serious problem worldwide. Engine exhaust of automobiles and motorcycles, and factory discharges are the major sources of pollutants. Engine exhaust pollutants of a motor vehicle are generated mostly by the following causes:

1. The low temperature in the combustion chamber when the engine is starting from cold.
2. Driving uphill, bumpy road conditions or heavy loads.
3. Poor quality of gasoline or oils.
4. Clogged air filter.
5. Intake of poor quality air from a tunnel or congested road.
6. Engine abrasion or too many pollutants in the combustion chamber.
7. Back pressure caused by a smoke filter or catalytic converter.

Engine exhaust gas includes smoke which contains solid particles and liquid drops. They all create severe air pollution problems and threaten the health of human beings and animals. Some of the exhaust gases discharge into the atmosphere and form "acid rain" which further creates a water pollution problem. The carbon dioxide in engine exhaust gas is also one of the factors causing the global greenhouse effect. Thus, to minimize engine exhaust pollution is becoming a worldwide focus.

Engine exhaust gases have the following characteristics:

1. High volume and high temperature.
2. High speed and impulsive vibration.
3. Viscosity after dispersion.
4. High vibration frequency and noise level.
5. Contains fine particles and becomes greasy.
6. Contains water vapor.
7. Contains gases of carbon dioxide, sulfer dioxide, carbon monoxide, etc.
8. Contains polynuclear aromatic hydrocarbons (PAH) and other cancer inducing or cell mutation gases.
9. Indirectly forms peroxyacety/nitrate (PAN) and other photochemicals which are environmentally harmful.

Many types of engine exhaust controlling or eliminating means have been developed, but they have disadvantages, as indicated below:

1. Wet type dust collector: tends to be blown away by vapor, consumes much water, tends to form erosive gas, not economical or pratical.
2. Honeycomb filter gauze formed of ceramic or metal: easily clogged by greasy smoke, incur back pressure, difficult operation, easily damaged, high cost, time consuming, short effective life, requires considerable backup materials.
3. Whirlwind type or static collector: large size, consumes much electric power, heavy load, not suitable for motor vehicles.
4. Additives in gasoline or diesel oil: while there are claims that the additives can improve combustion, not much evidence or proof is available for their effectiveness in eliminating toxic gas, and not conclusive as to whether or not the additives will be harmful to the engine.
5. Combustion smoke filter: provides better results, but high cost, consumes energy and oxygen, and produces more carbon dioxide gas, has explosion risk, limited effective life, not recyclable.

The above disadvantages have limited conventional exhaust controlling devices from being widely used. Thus, there has been a need for providing a more cost effective engine exhaust controlling means.

SUMMARY OF THE INVENTION

It is accordingly an object of the present invention to provide a means to clean the engine exhaust of an automobile or a motorcycle.

It is another object of the present invention to extend the application of this gas cleaner to a room or factory which has a limited and confined space.

Additional objects and advantages of the present invention are made apparent in the following detailed description of a preferred embodiment thereof, with reference to the accompanying drawings. The accompanying drawings and description only serve for reference and illustrative purpose, and are not intended to limit the scope of the present invention.

BRIEF DESCRIPTION OF THE DRAWINGS

FIG. 4 is a top view of a partition board used in the present invention.

FIG. 4A is a fragmentary section view taken along line 4A—4A of FIG. 4.

DESCRIPTION OF THE PREFERRED EMBODIMENT

Figure 1:
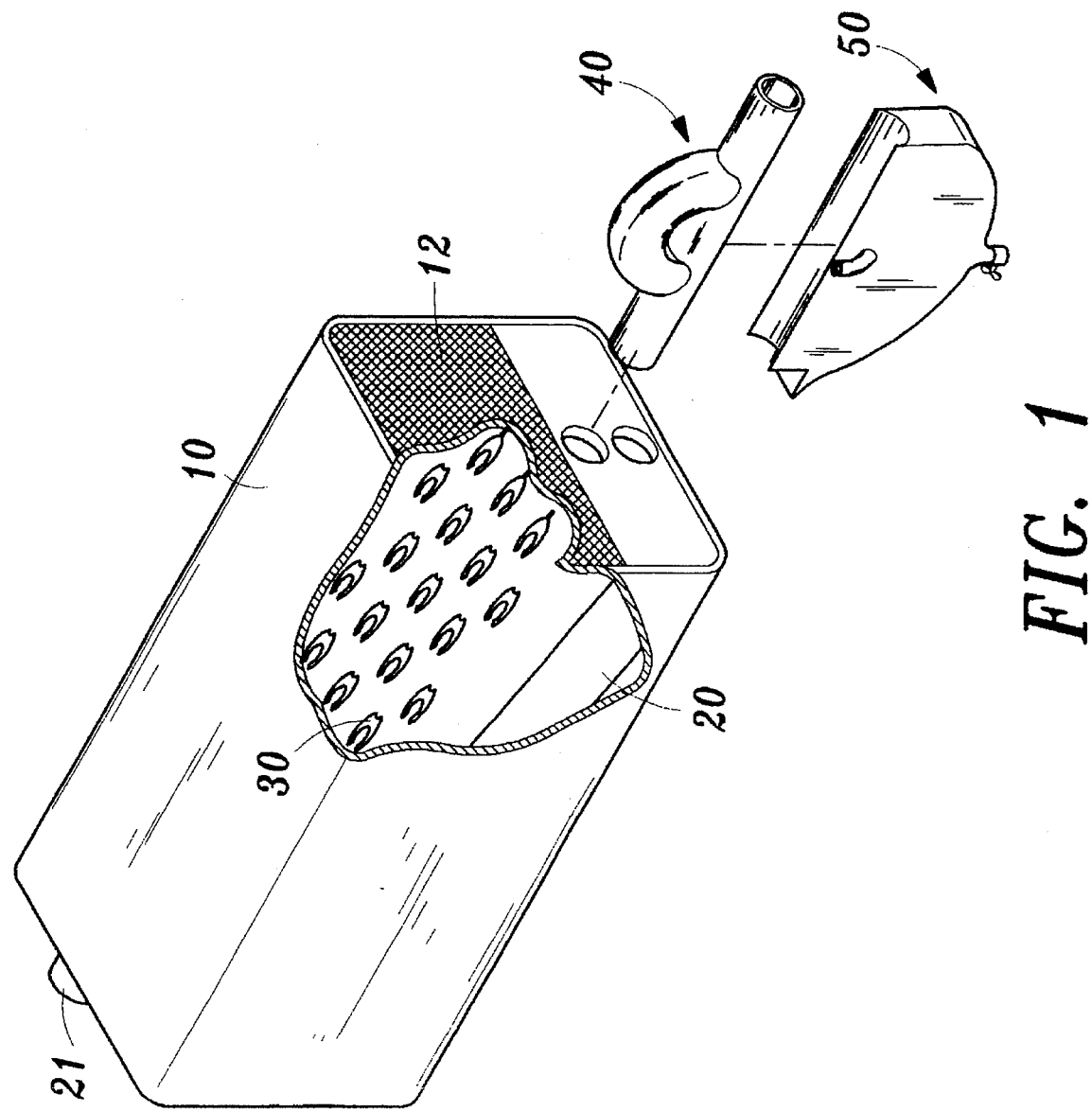
FIG. 1 is a fragmentary perspective view from one end of an apparatus according the present invention.
Figure 2:
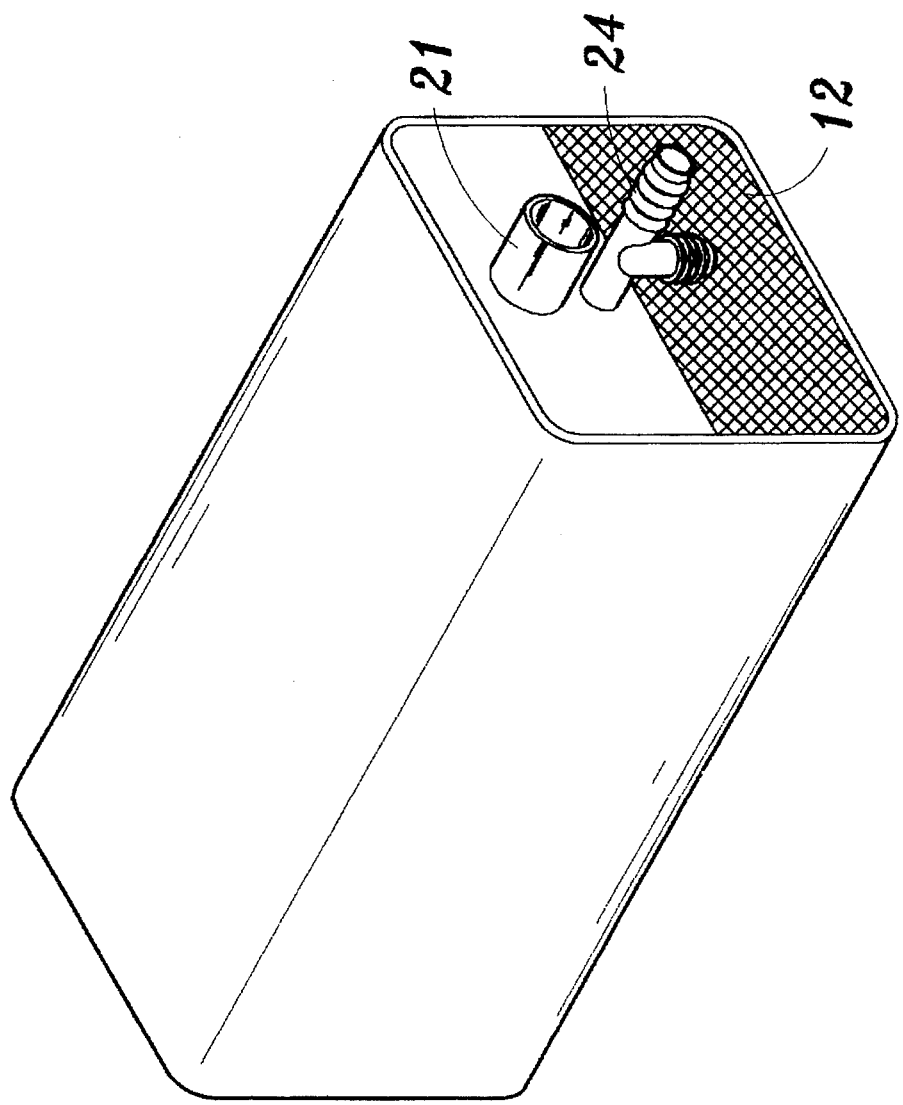
FIG. 2 is a perspective assembled view from another end of the present invention.

Referring to FIGS. 1 and 2, the gas cleaner apparatus of the present invention is formed of stainless steel, which can withstand high ternperatures, is corrosion-resistant, and is disposed at the exhaust pipe of a motor vehicle. Exhaust gas, after being discharged from the engine, enters a shell 10 of the gas cleaner through an intake pipe 21. The inside space of shell 10 is divided into two sections by an assembly of collection cylinders 30 and a partition container 20. One section contains a flow of cooling air which originates from the outside or passenger compartment of the motor vehicle. The air flows in through a filter 12 disposed at one lateral end of shell 10. Another section contains heated exhaust gas. The temperature difference of these two sections creates a dew-point effect to lower the temperature of exhaust gas and condense vapor therein into water. Contaminants in exhaust gas will dissolve in the water, while clean air discharges through a muffler 40 to the outside. The water which contains the contaminants accumulate and finally flow into a waste bucket 50.

Figure 3:
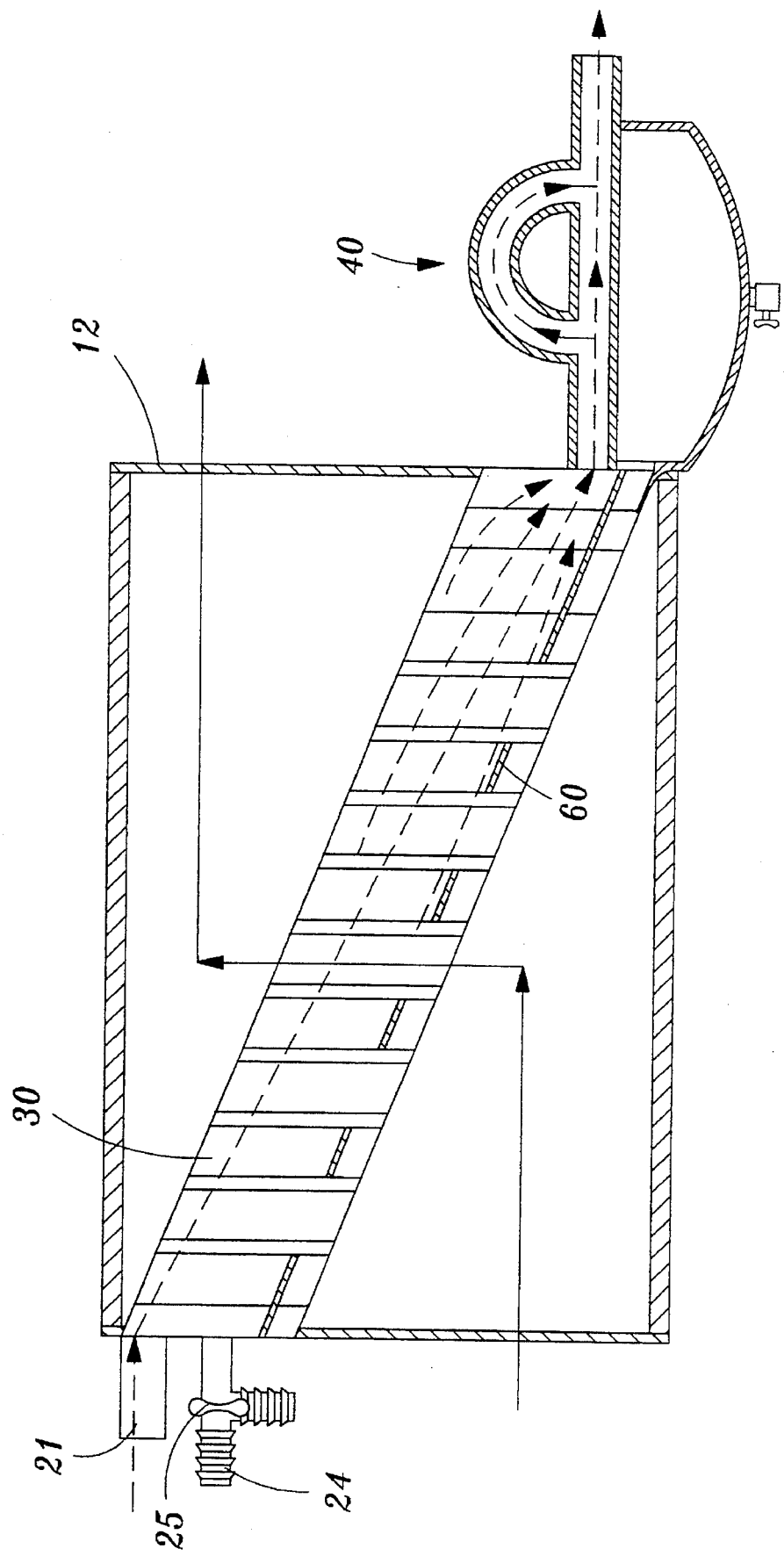
FIG. 3 is a section view of the present invention.

Referring to FIG. 3, the solid arrow lines illustrate the flow path of cooling air. Cooling air passes through filter 12 at the left of shell 10 and flows into the gas cleaner, pass through heat dissipating fins 31 which are disposed inside of collection cylinders 30, and then pass through filter 12 at the right of shell 10 and flows out of the gas cleaner.

The dotted arrow lines illustrate the flow path of the exhaust gas. Heated exhaust gas comes in from intake pipe 21, passes through collection cylinders 30 which remove the contaminatns contained in the exhaust gas, and then flows into muffler 40 and discharges to the outside. The temperature difference of cooling air and exhaust gas condenses the vapor in the exhaust gas and form water which further dissolves the contaminants in the exhaust gas, thus resulting in clean air.

Referring to FIG. 4A, container 20 includes a partition board 60 which is a stainless steel plate of rectangular shape with a plurality of partition openings 61 formed therein. Each partition opening 61 has the same corresponding shape as the transverse cross section of a collection cylinder 30, and thus allows a collection cylinder 30 to pass through opening 61 and be secured to partition container 20. Also referring to FIG. 6, a collection cylinder 30 has a front concave surface 33 and a rear concave surface 35. Each opening 61 of board 60 includes a pair of turbulent flanges 62 for respectively engaging concave surfaces 33 and 35 of collection cylinder 30. Turbulent flanges 62 serve as a funnel to guide greasy contaminants which drip into the bottom of collection cylinder 30 and flow into waste bucket 50.

Figure 5:
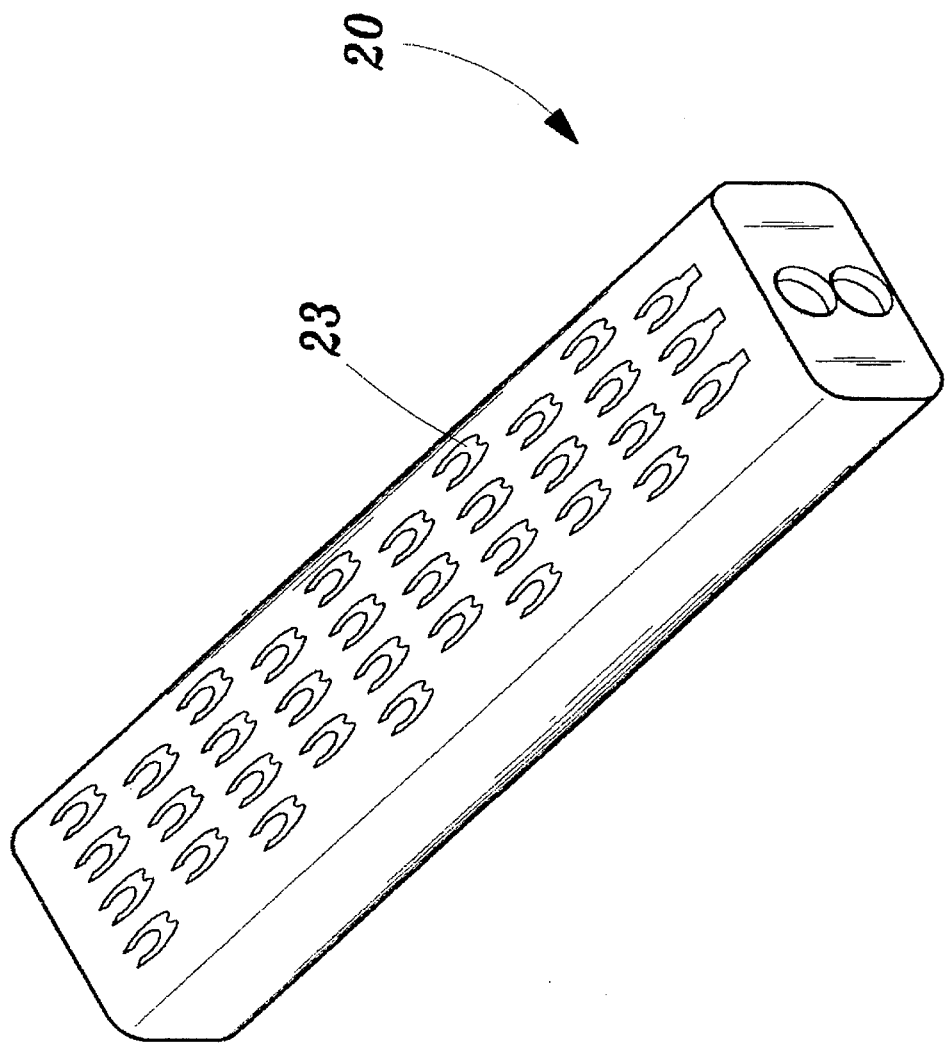
FIG. 5 is a perspective view of a partition container.

Referring to FIG. 5, a partition container 20 is in the form of a generally rectangular box with closed ends, and is disposed at an inclined angle inside the shell 10 to allow the greasy contaminants to flow into waste bucket 50. A plurality of openings 23 are formed in the top wall of partition container 20, with each opening 23 having the same corresponding shape and size as the transverse cross section of a collection cylinder 30. A collection cylinder 30 is disposed vertically through each top wall opening 23 of partition board 60. The contacting portions of collection cylinders 30 and openings 23 of collection container 20 are welded and sealed together.

Collection cylinders 30 are disposed alternately, in a staggered or offset pattern, so that exhaust gas pressure is evenly distributed around the intake pipe 21, and the flow speed of the exhaust gas may be slowed down upon entering into collection container 20. This permits the vapor sufficient time to condense into water, and also increases the contact time of the exhaust gas with collection cylinder 30, thus forming liquid water. The liquid water and exhaust gas contaminants then flow from each turbulent flange 62 into the bottom of partition container 20.

There are two vertically spaced openings on one lateral end of partition container 20, as seen in FIGS. 1 and 5. The upper opening connects with a muffler 40 and allows the cleaned and filtered exhaust gas to be discharged into the atmosphere. The lower opening connects with waste bucket 50 which receives and holds the combination of water and exhaust gas contaminants. The waste products can be recycled for producing printing ink, paints, fillers, etc., thus complying with environment protection requirements.

Referring to FIGS. 2 and 3, two pipe connectors 21 and 24 are disposed on another lateral end of partition container 20. Intake pipe 21 receives exhaust gas. Pipe 24 is branched into two tubes and controlled by a valve. One tube receives high pressure cleaning water to wash and clean the interior of partition container 20. Another tube connects with the water pump of a vehicle wiper system, and uses the soda water of the wiper system to neutralize the exhaust gas contaminants, thus further cleaning the interior of partition container 20.

Figure 6:
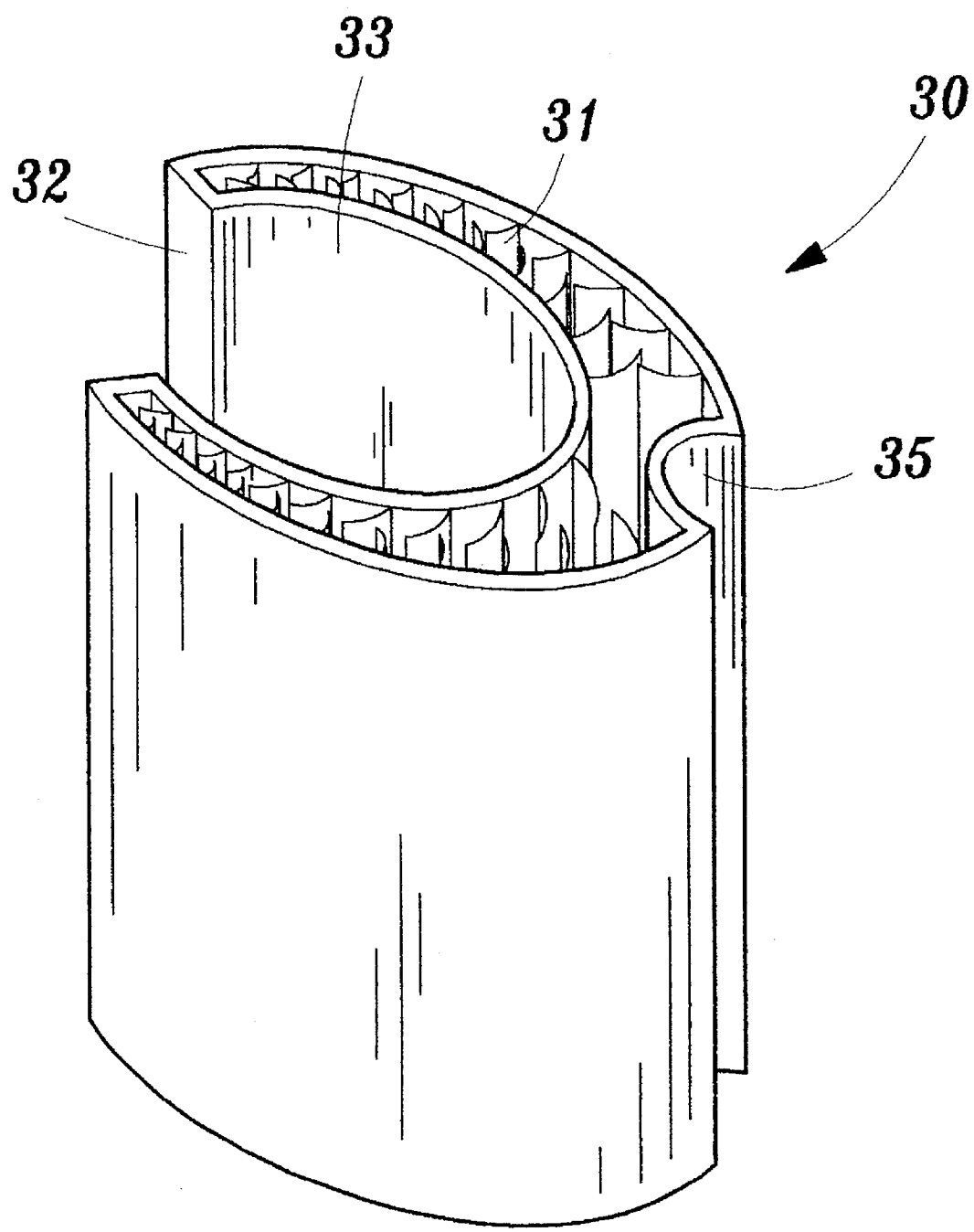
FIG. 6 is a perspective view of a collection cylinder.
Figure 8:
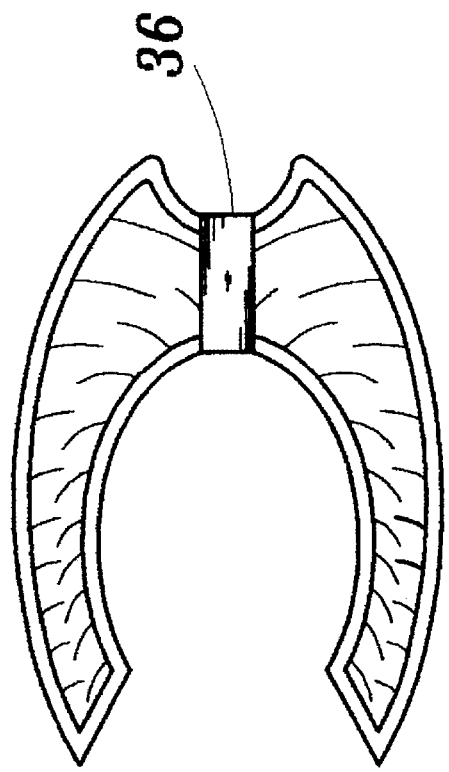
FIG. 8 is a bottom view of a collection cylinder.
Figure 7:
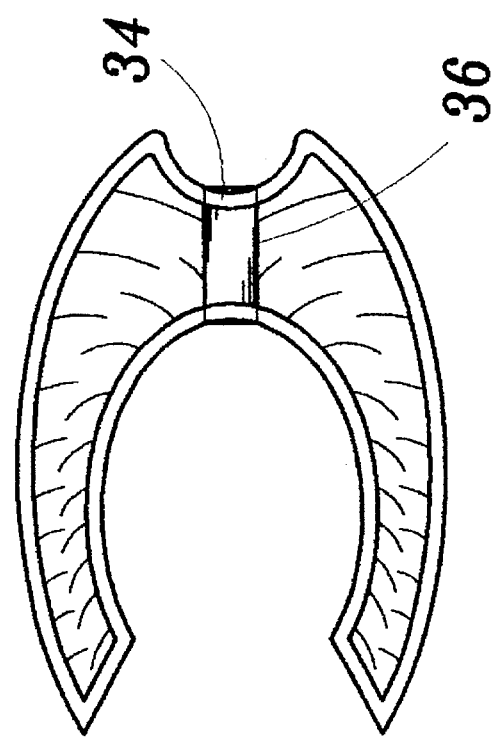
FIG. 7 is a top view of a collection cylinder.

Referring to FIGS. 6, 7 and 8, collection cylinder 30 has a smooth outside surface which permits exhaust gas and water vapor to condense and form a greasy mixture thereon and drip down to the bottom thereof. The interior of collection cylinder 30 is provided with a plurality of heat dissipating fins 31 which are disposed to allow cooling air to flow through and carry away the heat of exhaust gas to the outside. Opening 32 faces toward the intake pipe 21. Each collection cylinder 30 has a front concave surface 33 and a rear concave surface 35 to create turburlence in the exhaust gas and thereby reduce its flow speed, thereby facilitating heat transfer between the exhaust gas and heat dissipating fins 31. Water vapor condenses into liquid water on the outside surface of collection cylinder 30 after reaching the dew point temperature and dissolves the toxic gases, such as $CO_2$, and $SO_2$, into solution, and forms a greasy liquid mixture which gathers on the outside surface of collection cylinder 30. Accumulated greasy liquid mixture of water and exhaust gas contaminants then drip downward to the bottom of collection container 30.

A recess 34 is formed on the bottom of collection cylinder 30 and a flushing duct 36 is disposed therein. This permits a liquid mixture of water and exhaust gas contaminants deposited on the bottom of partition container 20 to flow into waste bucket 50.

Figure 9:
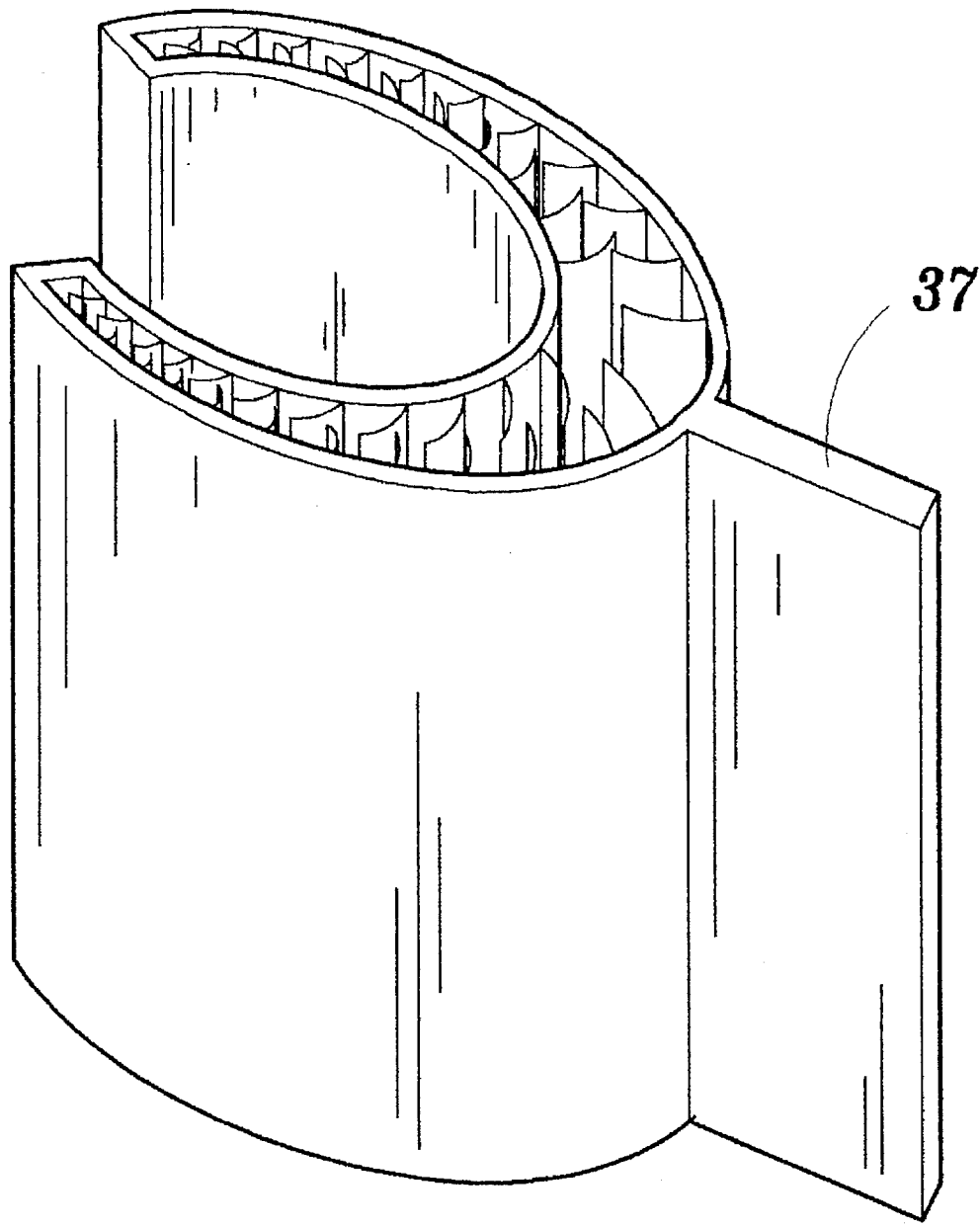
FIG. 9 is a perspective view of a collection cylinder utilized in the last row of the partition board.

Referring to FIG. 9, each collection cylinder 30 disposed at the last row of the pattern has a straight extraction fin 37 for creating another turbulence in the exhaust gas and thereby reduce exhaust gas noise.

Figure 10:
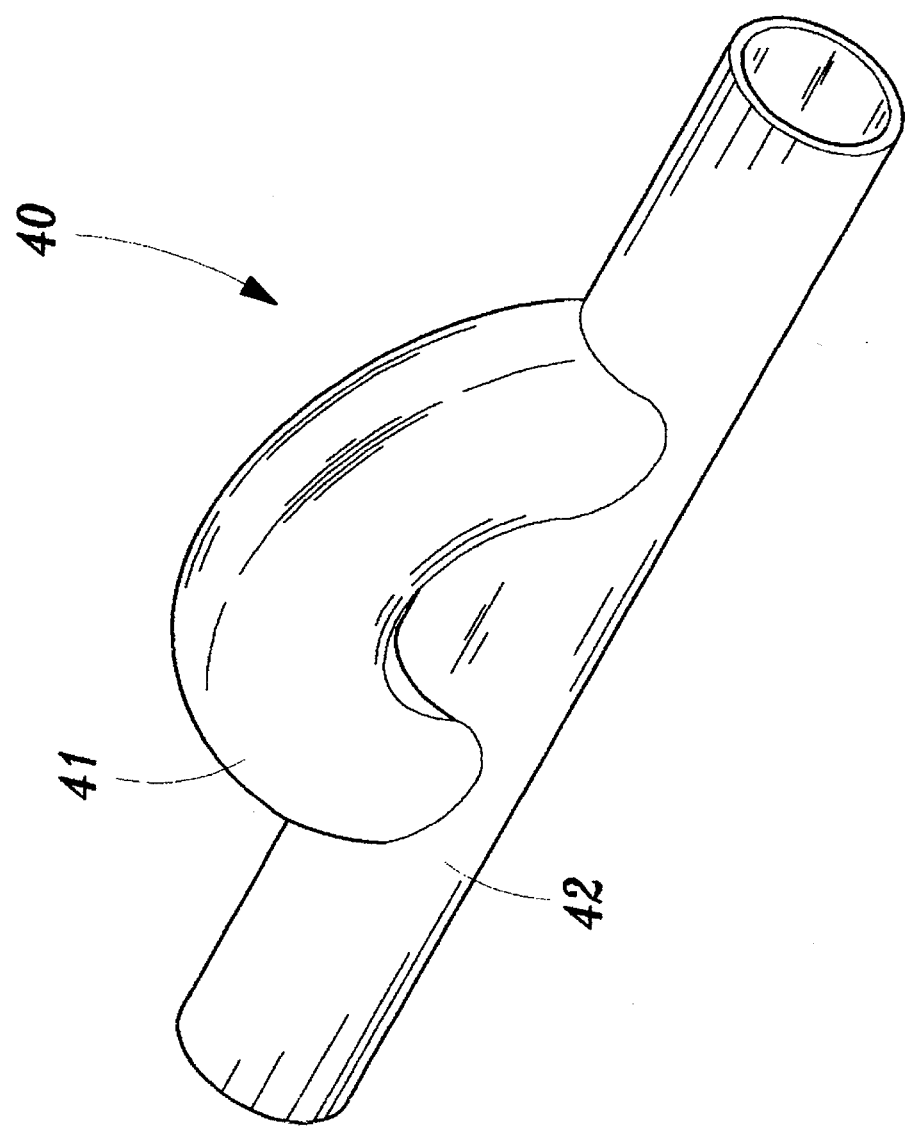
FIG. 10 is a perspective view of a muffler.

Referring to FIG. 10, a muffler 40 has a straight tube 42 and a branched curved tube 41. As seen in FIG. 3, exhaust gas flows into muffler 40 and splits into two paths, one directed to straight tube 42, while the other is directed to curved tube 41. By virtue of the Venturi tube principle, the different lengths of tubes 41 and 42 creates interference of the exhaust gas flow to reduce the noise level of the discharged exhaust gas. Compared to conventional mufflers employing multiple loops in a confined space, the present invention is of smaller size and more effective for reducing exhaust noise.

Figure 11:
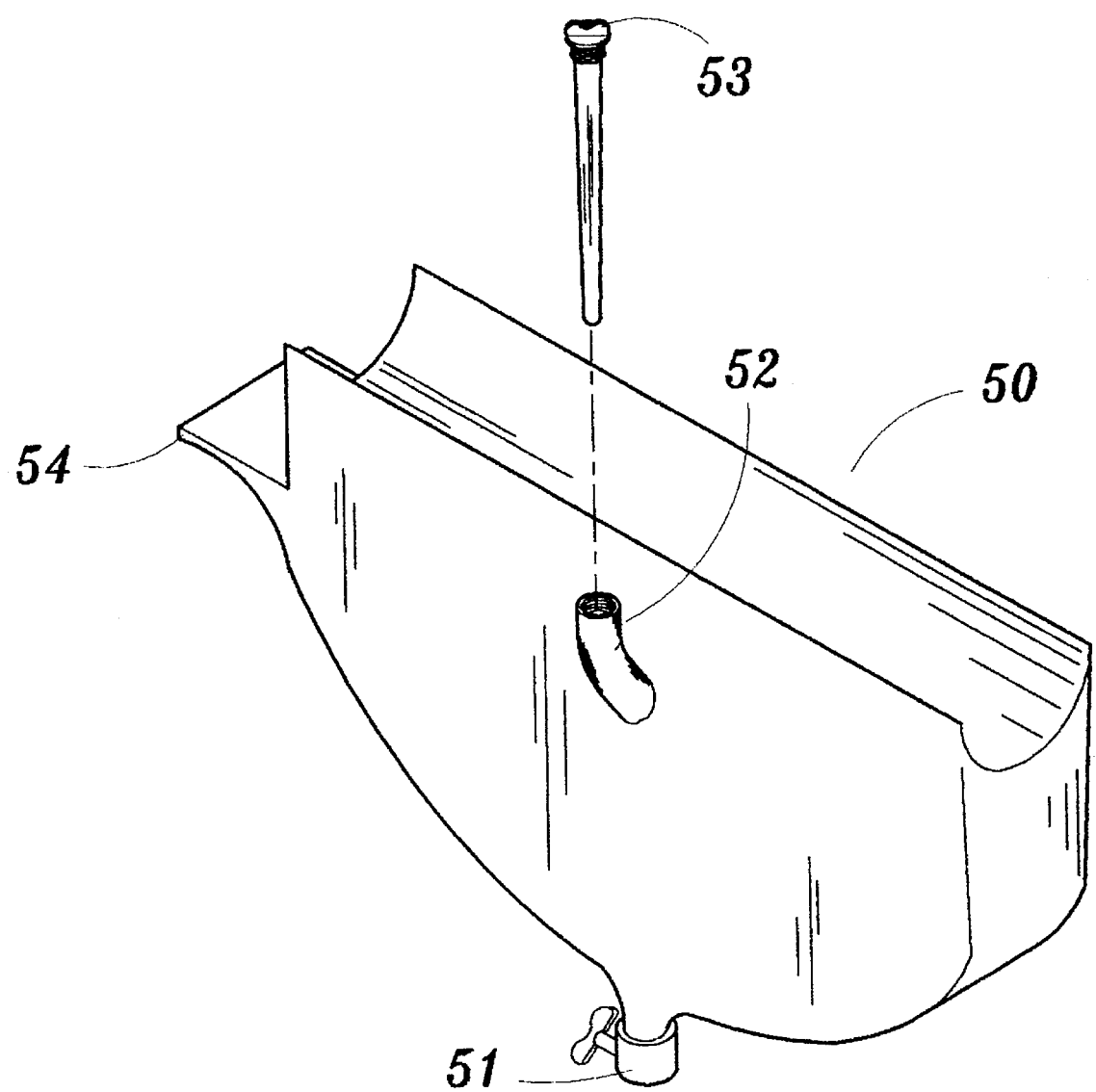
FIG. 11 is a perspective view of a waste bucket.

FIG. 11 illustrates a waste bucket 50 in the form of a generally funnel-shaped container. A guiding wedge 54 is formed at one end of waste bucket 50. Also referring to FIG. 3, waste bucket 50 is welded together with partition container 20. Guiding wedge 54 engages with an opening formed on a lateral end of partition container 20. Through gravity and vibration of the motor vehicle, the liquid mixture of exhaust gas contaminants gradually flow into waste bucket 50. A viewing hole 52 and a dip stick 53 are provided to measure the accumulating level of exhaust gas contaminants. A drain plug 51 is provided at the bottom of waste bucket 50 to discharge exhaust gas contaminants as required. The contaminants can be recycled for producing printing inks, paints, fillers, etc. like other oil-based derivatives. Therefore, the present invention can serve multiple purposes in this environment protection sensitive era.

Furthermore, the present invention is also applicable and adaptable to other small confined spaces or in a factory where air pollution of smoke or fine particles is a serious problem.

The characteristics and advantages of the present invention are sufficiently referred to in connection with the accompanying drawings and detailed description of the preferred embodiment set forth above. Those skilled in the art will understand that variations may be made without departing from the principles of the disclosed invnetion. Accordingly, the specific scope of the present invention is defined only by the appended claims.

The characteristics and advantages of the present invention are sufficiently referred to in connection with the accompanying drawings and embodiments set forth above. After considering this example, skilled persons will understand that variation may be made without departing from the principles and scope disclosed. Accordingly, the specific scope of the present invention is defined only by the following claims which are further exemplary of the present invention.

What is claimed is:

1. An exhaust gas cleaning apparatus comprising:

a) a shell container formed from stainless steel plate, the shell container including a front lateral end and a rear lateral end, and a filter at each lateral end;

b) a plurality of collection cylinders, each collection cylinder being in the form of a hollow duct having a smooth outside surface including a concave front surface and a concave rear surface, the hollow duct having a plurality of heat dissipating fins disposed therein, a recess formed at a bottom thereof and a flushing duct disposed within the recess;

c) a rectangular-shaped partition board formed of stainless steel, the partition board including a plurality of openings formed therein, each opening having the same configuration as the exterior cross-sectional configuration of the collection cylinder and including a front inclined turbulent flange and a rear inclined turbulent flange, a collection cylinder engaged within each opening, with the front inclined turbulent flange facing the concave front surface and the rear inclined turbulent flange facing the concave rear surface;

d) a rectangular-shaped partition container disposed at an inclined angle within the shell container, the partition container including a front lateral end, a rear lateral end and a top wall, a plurality of cavities formed in the top wall, each cavity having the same configuration as the exterior cross-sectional configuration of each collection cylinder, a collection cylinder vertically disposed and firmly engaged within each cavity, an intake pipe disposed at the front lateral end of the partition container for permitting exhaust gas to flow into the partition container, a cleansing duct disposed at the front lateral end of the partition container, the cleansing duct including a pair of tube openings and a two-way valve disposed therein, one tube opening for receiving high pressure water and the other tube opening for receiving soda water for cleaning the interior of the partition container, and an upper opening and a lower opening formed in the rear lateral end of the partition container;

e) a muffler including a straight tube and a curved tube, the curved tube including two ends connecting with the straight tube for receiving exhaust gas flow from and redirecting exhaust gas flow to the straight tube, and the straight tube including an end connected with the upper opening of the partition container; and f) a funnel-shaped waste bucket including a guiding wedge engaged with the lower opening of the partition container and means for draining exhaust gas contaminants collected in the waste bucket.

2. The apparatus of claim 1 wherein the waste bucket includes a side wall and a viewing hole and a dipstick provided on the side wall for measuring the accumulating level of exhaust gas contaminants within the waste bucket.

3. An exhaust gas cleaning apparatus comprising:

a) a shell container including a front end provided with an exhaust gas inlet and a rear end provided with an exhaust gas outlet, and a filter at each of the front and rear ends for permitting air to flow through the shell container.

b) a partition container including a front end and a rear end, the partition container being disposed at an incline within the shell container for permitting the front end of the partition container to receive exhaust gas from the exhaust gas intake of the shell container and the rear end of the partition container to discharge exhaust gas through the exhaust gas outlet of the shell container;

c) a plurality of collection cylinders disposed within the partition container, each collection cylinder including a plurality of heat dissipating fins disposed therein and a smooth exterior surface defined by a concave front surface and a concave rear surface for contacting the exhaust gas and condensing the vapor contained therein through heat exchange with the air passing through the partition container; and d) a muffler and a waste bucket at the exhaust gas outlet of the shell container for reducing the noise of discharged exhaust gas and accumulating exhaust gas contaminants.

* * * * *